J. NUSBAUM.
VEHICLE WHEEL.
APPLICATION FILED MAY 26, 1916.

1,199,104.

Patented Sept. 26, 1916.

WITNESSES:
Harry A. Benney
Elsie M. Siegel

INVENTOR.
John Nusbaum.
BY
Ernst Starck
ATTORNEY

UNITED STATES PATENT OFFICE.

JOHN NUSBAUM, OF ST. LOUIS, MISSOURI, ASSIGNOR OF ONE-HALF TO HERMAN KROEMER, OF ST. LOUIS, MISSOURI.

VEHICLE-WHEEL.

1,199,104.  Specification of Letters Patent.  Patented Sept. 26, 1916.

Application filed May 26, 1916. Serial No. 100,050.

*To all whom it may concern:*

Be it known that I, JOHN NUSBAUM, a citizen of the United States, residing at St. Louis, State of Missouri, have invented certain new and useful Improvements in Vehicle-Wheels, of which the following is a full, clear, and exact description, reference being had to the accompanying drawings, forming a part hereof.

My invention has relation to improvements in vehicle wheels; and it consists in the novel features of construction more fully set forth in the specification and pointed out in the claims.

The object of my invention is to construct a vehicle wheel which will dispense with the necessity of the prevailing pneumatic tire, and yet provide the resiliency which is inherent in wheels equipped with such tires.

A further object is to construct a wheel which may be readily repaired in the event of wear or breakage of any of its component parts, the wheel being so constructed as to be readily taken apart and put together, with a minimum loss of time.

A further object is to provide a wheel which is durable, light, and relatively cheaper than wheels of the pneumatic tire class, and one possessing further and other advantages better apparent from the following detailed description in connection with the accompanying drawings, in which—

Figure 1:
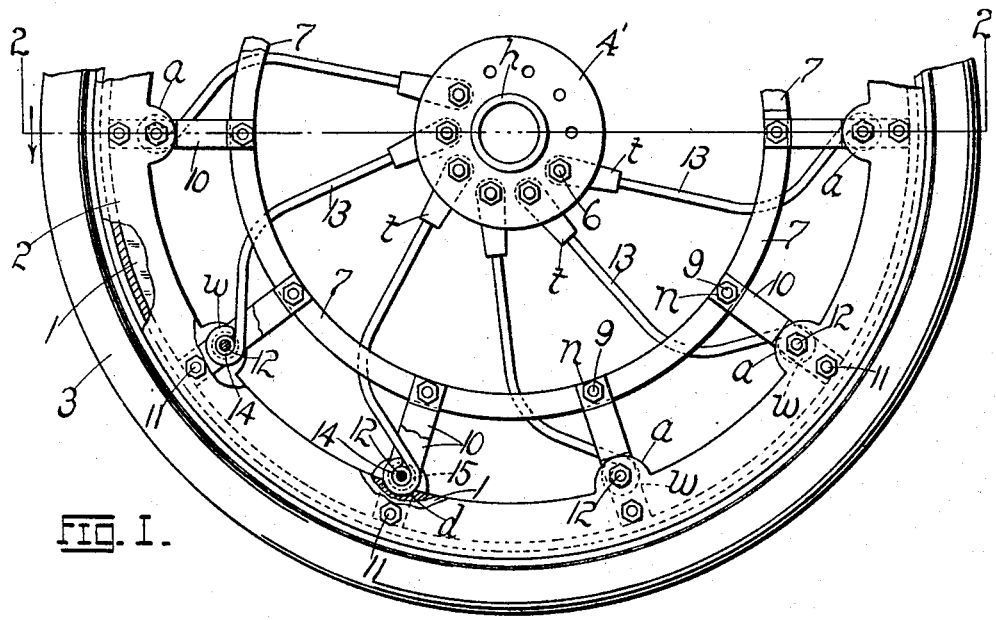
Figure 2:
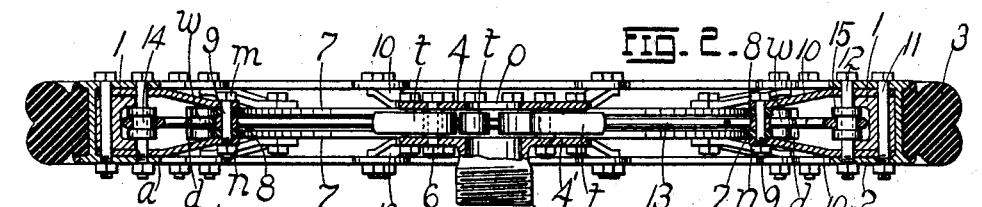
Figure 3:
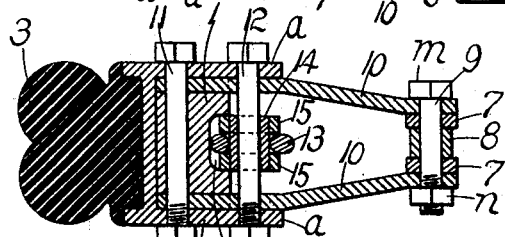
Figure 5:
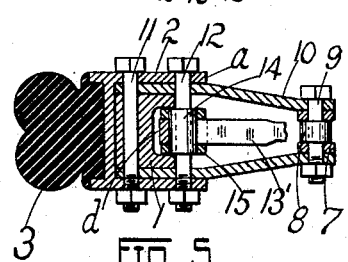
Figure 4:
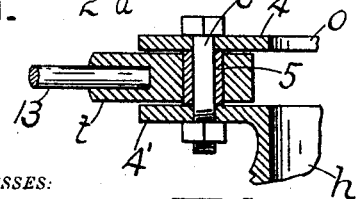

Figure 1 represents a side elevation of one-half of a wheel made according to my invention; Fig. 2 is a cross-section on the line 2—2 of Fig. 1; Fig. 3 is an enlarged cross-section on the line 2—2 of Fig. 1, of the outer portions of the wheel; Fig. 4 is an enlarged cross-section on the line 2—2 of Fig. 1 of the hub portion of the wheel; and Fig. 5 is a cross-section similar to Fig. 3, showing a modified form of spring spoke.

Referring to the drawings, and for the present to Figs. 1 to 4 inclusive, 1, represents the felly of the wheel which in the present instance is incased in the felly channel-ring 2 the edges of whose flanges are provided with lobes or ears $a$ corresponding in number to the number of spokes in the wheel. The ring 2 is provided with a peripheral depression for the seating and reception of the tire or tread member 3 which in the present example is of solid rubber or equivalent material.

In the present embodiment of my invention the hub is formed of two plates or disks 4, 4′, the latter having formed thereon the hub $h$ alined with an opening $o$ in the plate 4, the hub plates being spaced apart by sleeves or thimbles 5 through which loosely pass the bolts 6 by which the hub-plates are connected together.

Disposed between the felly and the hub are spoke guide-rings 7, 7, maintained a fixed distance apart by sleeves or spacing thimbles 8, through which and through the rings pass the securing bolts 9. These bolts likewise serve to anchor the inner ends of the straps 10, said inner ends being interposed between the rings 7, 7, and the heads $m$ and nuts $n$ of the bolts, respectively (Fig. 3). The outer ends of the straps 10 are embedded in the side faces of the felly so as to come flush therewith (that is to say, countersunk), the straps being disposed radially in pairs at points opposite the ears or lobes $a$ of the flanges of the channel ring 2, and terminating at the base of the channel of said ring. The parts 1, 2, and 10 are secured together by the outer series of bolts 11 passed through the several members, and by the inner series of bolts 12 in radial alinement with the outer series, the bolts 12 passing through the ears $a$ of the flanges of the channel-ring 2 and through the straps 10, and merely engaging the inner cylindrical face of the felly 1. Passed about the spacing thimbles 5 between the hub plates 4, 4′, are the inner enlarged ends $t$ of the resilient flexed spokes or springs 13, the inner portions of the spokes being substantially straight and disposed at an angle to the radii of the wheel as fully shown in Fig. 1. The spokes pass between the guide rings 7, 7, and are bent at points between the rings, the bends of the several spokes being in the same direction. The outer terminals of the spokes are wrapped or coiled about the sleeves or bushings 14 carried by the inner bolts 12, the wraps being bounded by guards or spacing rings 15, 15, passed over the sleeves, lateral displacement of the guards being prevented by the side walls of the pockets or depressions $d$ formed on the inner wall of the felly for their reception and for the reception of the terminal wraps of the spokes confined between them.

The operation is obvious, but may be briefly described as follows: The bent spokes 13 are virtually flexed springs, the same yielding freely at the bends between the guide rings 7, 7, with variations of load or by reason of the vehicle passing over rough places in the road, the jars incident thereto being absorbed by the spokes or flexed springs aforesaid. The rings 7, 7, maintain the spokes in the plane of rotation of the wheel, the yielding movements of the spokes being thus confined to said plane. Should a spoke break, a new spoke can be readily put in its place by the mere removal of the bolts 12 and 6 by which the spoke is secured, and the restoring of the bolts with the replacing of the broken spoke with a new spoke. To insure better action for the spokes the outer terminal wraps $w$ are coiled in a reverse direction from the concavity of the bend in the spoke, the wrap being on the side of the convex curvature of the bend (Fig. 1). By this arrangement the strain imposed on the wrap or coil is in the main confined to the portion first bent from body of the spoke rather than to the free end of the coil. This prevents the coil from opening with the constant jarring of the vehicle.

In the figures referred to, the cross-section of the spring composing the spoke is substantially circular; but in the modification shown in Fig. 5, I employ a flat spoke or spring 13′, the remaining parts of the structure being the same as already described. I may of course depart from the details shown without in any wise affecting the nature or spirit of my invention.

Having described my invention what I claim is:

1. A vehicle-wheel comprising a felly, a channel ring inclosing said felly, a pair of hub plates maintained a fixed distance apart, means for coupling the hub-plates together, a pair of guide rings spaced apart, interposed between the felly and hub plates, straps disposed radially in pairs for coupling the guide rings to the felly, and resilient spokes operating between the guide rings having their inner ends anchored between the hub-plates and their outer ends secured between the straps at points adjacent the felly, the spokes being bent at points between the guide rings, and having straight portions disposed on opposite sides of the bends.

2. A vehicle-wheel comprising a felly, a channel-ring inclosing the same, a pair of hub plates maintained a fixed distance apart, bolts connecting said plates, a pair of guide rings spaced apart and interposed between the felly and hub plates, straps disposed radially in pairs for securing the guide rings to the felly, the outer ends of the straps being countersunk in the felly, bolts disposed on concentric circles for securing together the felly, channel-ring and straps, bolts securing the inner strap ends to the guide rings, and resilient spokes confined between the guide rings and between the straps and having their opposite ends anchored respectively to the bolts connecting the hub-plates and to the inner members of the outer series of bolts, the spokes being bent at points between the guide rings and having straight portions leading from the bends to their respective points of anchorage.

3. A vehicle-wheel comprising a felly, a channel ring inclosing said felly, a pair of hub-plates maintained a fixed distance apart, means for coupling the hub-plates together, a pair of guide rings spaced apart, interposed between the felly and hub-plates, straps disposed radially in pairs for coupling the guide rings to the felly, bolts disposed circularly on the flanges of the channel ring, and resilient spokes operating between the guide rings and having their opposite ends anchored respectively between the hub plates and between the straps to the bolts aforesaid, the spokes having straight portions merging in bends at points between the guide rings.

In testimony whereof I affix my signature, in presence of two witnesses.

JOHN NUSBAUM.

Witnesses:
EMIL STAREK,
ELSE M. SIEGEL.